CODE CONVERSION CIRCUITRY

Filed Dec. 30, 1960 5 Sheets-Sheet 1

CODE CONVERSION CIRCUITRY

Filed Dec. 30, 1960 5 Sheets-Sheet 3

CODE CONVERSION CIRCUITRY

Filed Dec. 30, 1960 5 Sheets-Sheet 5

United States Patent Office 3,068,464

Patented Dec. 11, 1962

3,068,464

CODE CONVERSION CIRCUITRY

Hidetoshi Takahashi and Hiroshi Yamada, Tokyo, Japan, assignors to Fuji Tsushinki Seizo Kabushiki Kaisha, Kawasaki, Japan, a company of Japan Filed Dec. 30, 1960, Ser. No. 79,826
Claims priority, application Japan Oct. 22, 1955
6 Claims. (Cl. 340—347)

This application is a continuation-in-part of our application Serial No. 616,565, filed October 17, 1956, and relates generally to code conversion circuitry and more particularly to switching circuitry for converting binary-coded data from parallel modes of transmission to time-sequential modes by use of parametron networks connected in various switching circuit configurations.

It is a principal object of the present invention to provide switching networks by which parallel modes of storing and transferring data are converted to serial transmission modes in computers or automatic control devices.

A feature of the invention is the provision of a parallel type register consisting of a plurality of parallel parametrons equal in number to that of the parallel binary code bits to be converted to series bits. A converter constructed by using parametrons is connected in series with the parallel register and to it are applied control inputs whose signs or polarities are constantly opposite and change with time. A series output network or circuit consisting of one parametron in series with the converter transmits the series code or bits as an output. The input signals representative of the binary-coded data are applied to the register in parallel paths. In the various apparatus the phase of the outputs is controlled by the sign or polarity of an input applied to the resonant circuit of the parametrons in the converter.

Where a four binary digit parallel code is being converted to a binary digit series code the register consists of four parametrons and the converter comprises two parametrons in cascade with the register parametrons. The output of a first parametron in the register is not transmitted. The output of the second parametron is applied to one of the converter parametrons and the output of the third parametron is applied to the other of the converter parametrons while the output of the fourth parametron in the parallel register is applied or transferred to both of the parametrons in the converter. The output circuit consists of one parametron to which a constant value "1" is applied beside the output from each parametron from the converter. A control input applied to one of the two parametrons in the converter is variable from binary digit "0" to binary digit "1" and "1" to "0" respectively.

Another embodiment of the invention is one in which the register comprises eight parametrons in parallel to convert an input eight binary digit parallel code into a series binary code. The converter is arranged in three stages in cascade. The first stage has eight parametrons in series with the eight parametrons of the register and receive the outputs therefrom. A second stage in cascade with the first comprises four parallel parametrons and a third series stage of two parallel parametrons complete the converter.

The parametrons of the first stage of the converter are arranged in pairs. To one of every pair of parametrons a constant value "0" is applied and the respective pairs of parametrons have their outputs applied to a respective one of the four parametrons in the second stage. A constant value "1" is applied to every other one of the parametrons in the second stage so that there are two pairs of parametrons in which one of the parametrons has a constant value "1" applied thereto. The pairs of parametrons on the second stage are connected to provide their outputs to a respective one of the two parametrons in the third stage. One of these two parallel parametrons in the third stage has a constant value "1" applied thereto. A single parametron forms the output series circuit from which the series code is taken as an output. The output circuit has a constant value "1" applied thereto as well as the outputs of the two parametrons of the third stage of the converter. To each of the stages of the converter is applied a respective variable control input.

A variable control input is applied to the parametrons in the first stage to which the constant value "0" is applied and a variable input is applied to the parametrons in the second stage other than those to which the constant value "1" is applied and a third variable control input is applied to both the parametrons of the third stage of the converter.

Other features and advantages of the switching circuitry in accordance with the present invention will be better understood as described in the following specification and appended claims, in conjunction with the following drawings in which:

FIG. 1 is a diagram of a core, with a coil developed thereon, and its G—H curve for illustrating parametric oscillation;

FIGS. 2*a*, and 2*b* are schematic diagrams of inductance change in the coil of FIG. 1 in parametric oscillation;

Figures 11, 12A:
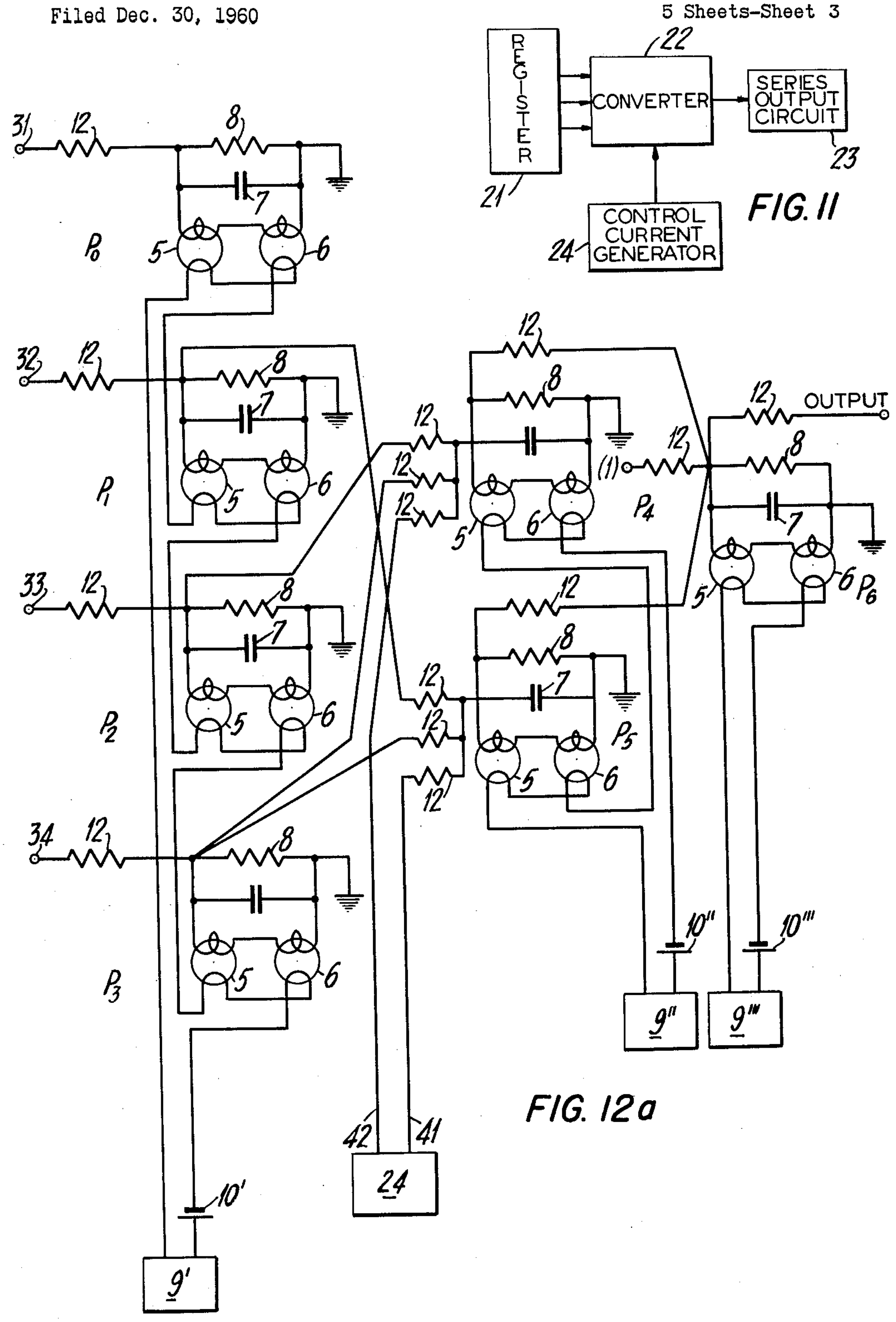
FIG. 11 is a block diagram of switching circuitry forming a code converting apparatus according to the present invention.
Figure 12B:
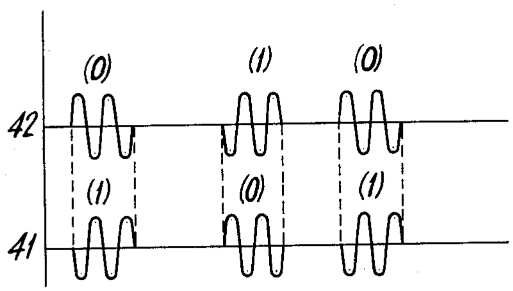
Figure 12C:
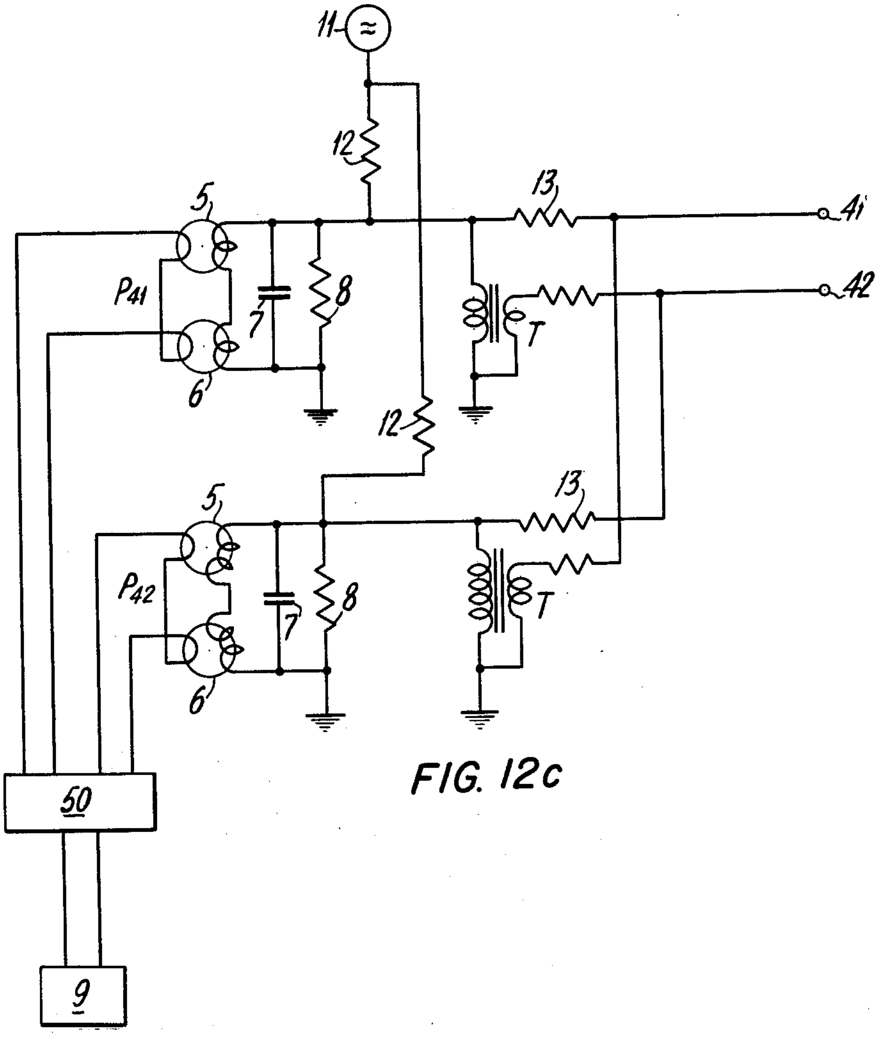
Figure 12D:
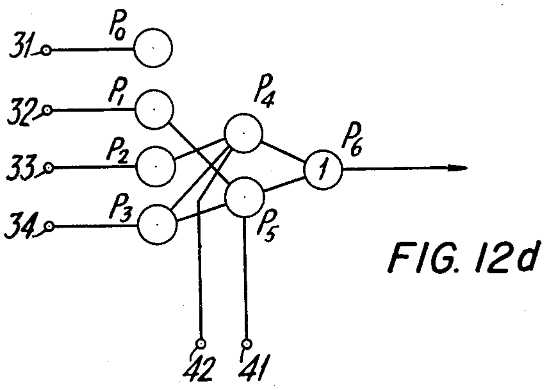
Figure 13A:
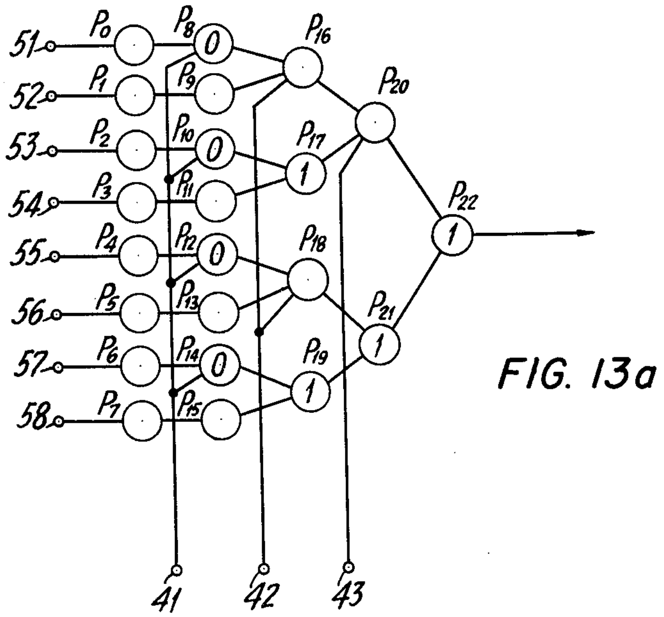
Figure 13B:
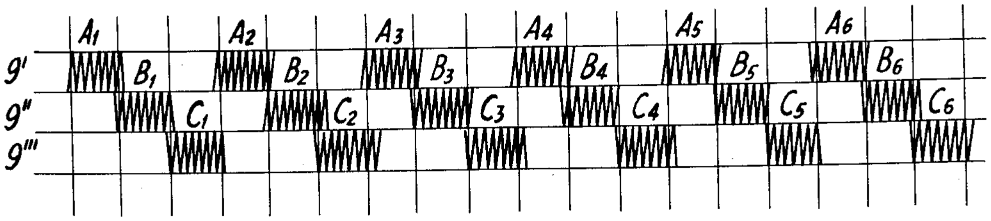

FIG. 12*a* is a schematic diagram of circuitry forming an apparatus for converting four binary-coded parallel inputs to a serial binary-coded output;

FIG. 12*b* is a diagram of the control inputs or currents for controlling the apparatus of FIG. 12*a*;

FIG. 12*c* is a schematic diagram of the control current generator shown in FIG. 12*a*;

FIG. 12*d* is a simplified symbolic diagram of the apparatus shown in FIG. 12*a*;

FIG. 13*a* is a symbolic diagram of an apparatus for converting eight binary digit parallel code to a serial code output; and FIG. 13*b* is a diagram of the synchronizing currents of the apparatus in FIG. 13*a*.

In order to understand the present invention a brief description of the basic digital computer element, the parametron, follows.

In 1954, Dr. Eiichi Goto, discovered that a phenomenon called parametric oscillation which had been known for many years, can be utilized to perform logical operations and memory functions, and gave the name "parametron" to the new digital component made on this principle.

Parametric oscillation, from which the name "parametron" derives, is not an unfamiliar phenomenon—a playground swing and Melde's experiment are examples of parametric oscillations in mechanical systems. In order to drive a swing, the rider bends and then straightens his body and thereby changes the length $l$ between the center of gravity of his body and the fulcrum of the ropes. The swing is a mechanical resonant system and its resonant frequency is determined by the length $l$ and the gravitational constant $g$. The oscillation of the swing is energized by the periodic variation of the parameter $l$ which determines the resonant frequency.

Figure 1:
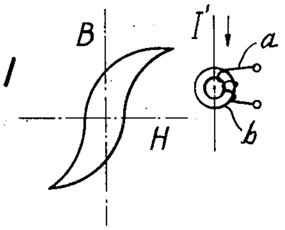
Figure 2:
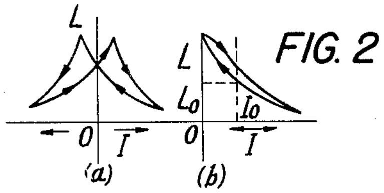

It is known that when an alternating current I is applied to terminals X on winding *a* on a ferrite core *b* as in FIG. 1, having a B—H curve as shown, the inductance L thereof varies as shown in FIG. 2*a*. If a frequency or current which changes in one direction between zero and some other value is applied to the winding, where $I_0$ is the center current, then inductance L varies as shown in FIG. 2*b*. The total current I, consisting of the direct current $I_0$ and the high frequency current having an angular frequency $\omega$, flows through the terminals X and the inductance changes by the angular frequency $\omega$. This is known as parameter excitation.

Figure 3:
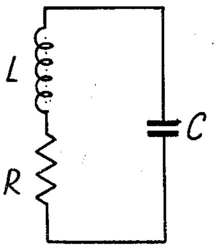
FIG. 3 is a schematic diagram of a resonant circuit for illustrating the theory of parametrons.

In an electrical system, inductance and capacitance are the parameters which determine the resonant frequency. Parametric oscillation therefore can be produced in a resonant circuit, FIG. 3, by periodically varying one of the reactive elements, L, C, composing the resonant circuit.

Figure 4:
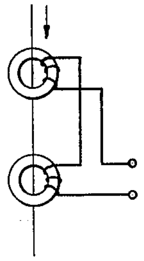
FIG. 4 is a diagram of a pair of nonlinear reactors usable in construction of a parametron.

A parametron element is essentially a resonant circuit with a reactive element varying periodically at frequency $2f$ which generates a parametric oscillation at the subharmonic frequency $f$. In practice, the periodic variation is accomplished by applying an exciting current of frequency $2f$ to a pair of nonlinear reactors, such as ferrite-core coils (FIG. 4) and a resonant circuit of nonlinear elements and connected as later herein described.

Figures 5, 7:
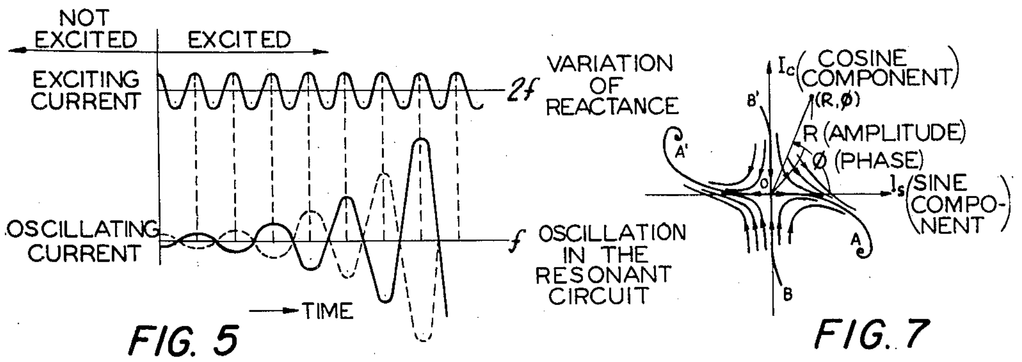
FIG. 5 is a diagram illustrative of the oscillations of parametrons.
FIG. 7 is a diagram of the amplitude-to-phase (R, $\phi$) locus of an oscillating parametron.

The subharmonic parametric oscillation thus generated has a remarkable property in that the oscillation will be stable in either of two phases which differ by $\pi$ radians with respect to each other. Utilizing this fact, a parametron represents and stores one binary digit, "0" or "1," by the choice between these two phases, 0 or $\pi$ radians. The solid line and the dotted line in FIG. 5 illustrate the building up of these two kinds of oscillation.

Under certain resonance conditions, the oscillation generated in the parametron is "soft," that is, it is easily self-started from any small initial amplitude. In this case, the choice between the two stable phases of the oscillation having a large amplitude can be made by controlling the phases of the small initial oscillation. This fact may be regarded as amplification and its mechanism may best be understood as superregeneration with the phase of the oscillation representative of two stages. In order to make use of this effectively, quenching means are provided in parametron circuits to interrupt parametric oscillation. Besides the memory and amplifying action, parametrons can also perform various logical operations based on a majority principle by applying the algebraic sum of oscillation voltages of an odd number of parametrons to another parametron in which the algebraic sum voltage works as the small initial oscillation voltage.

Mathematical studies on parametric oscillations of small amplitude in a linear region have been conducted in detail in the past. The results will be found in textbooks on differential equations under such headings as linear differential equations with periodic coefficients, Mathieu's equation, Hill's equation, and Floque's theorem.

The application of parametric oscillation to amplifying electrical signals is not a new idea. United States Patent 1,884,845 discloses an amplifier based on the same principle as the parametric amplifier, which is now one of the most discussed topics in the field of electronics. In a parametric amplifier, two resonant circuits, respectively tuned to signal frequency $f_s$, and idling frequency $f_i$, are coupled together regeneratively through a nonlinear reactor to which is applied a voltage of pumping frequency $f_p$, satisfying the condition $f_p=f_i+f_s$. A parametric amplifier performs regenerative amplification of signals and may produce as well, a pair of spontaneous oscillations at frequency $f_s$ and $f_i$.

A parametron producing a subharmonic oscillation may be regarded as a degenerative case of a parametric amplifier, in which the two resonant circuits for $f_s$ and $f_i$ are reduced to a single common circuit, so that $f_s=f_i=f$, and $f_p=2f$. Consequently, the basic principle of the amplifying mechanism of the parametron may be considered the same as that of the parametric amplifier. The degeneracy in the number of resonant circuits, however, makes possible the phase quantizing nature of the oscillation. While this is generally unfavorable for amplifying ordinary continuous waves, it is very useful for representing and storing a binary digit in the parametron.

Figure 6:
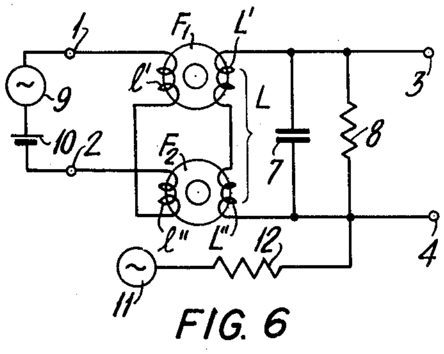
FIG. 6 is a schematic diagram of a parametron.

The parametron is essentially a resonant circuit in which either the inductance or the capacitance is made to vary periodically. FIG. 6 shows a circuit diagram for a parametron element. The parametron element in FIG. 6 consists of coils wound around two magnetic ferrite toroidal cores F1 and F2, a capacitor 7, and a damping resistor 8 in parallel. Each of the cores F1 and F2 has two windings and these are connected together in a balanced configuration. One winding $L=L'+L''$ forms a resonant circuit with the capacitor 7 and is tuned to frequency $f$. An exciting current is applied at input terminal 1, 2 and is a superposition of a radio frequency current of frequency $2f$, from source 9 and a D.C. bias from D.C. source 10 is applied to the other winding, $l'+l''$, causing periodic variation in the inductance $L=L'+L''$ of the resonant circuit at frequency $2f$.

A second subharmonic parametric oscillation is generated in the resonant circuit to which is connected output terminals 3, 4. The phase of this parametric or output oscillation is dependent upon the phase of an input control oscillation of frequency $f$ applied to the resonant circuit from an oscillator 11 or some similar source coupled to the resonant circuit, for example, through a coupling resistance 12.

The operation of the parametron is based on a spontaneous generation of a second subharmonic parametric oscillation, that is a self-starting oscillation of frequency $f$, in the resonant circuit. Parametric oscillation is usually treated and explained in terms of Mathieu's equation. A more easily understood explanation, however, may be obtained by the following consideration.

Let the inductance L of the resonant circuit be varied as $$L=L_0(1+2\Gamma \sin 2\omega t) \qquad (1)$$

where $\omega=2\pi f$, and $\Gamma$ (gamma) is the modulus of parametric excitation and let us assume the presence of a sinusoidal A.C. current $I_f$ in the resonant circuit at frequency $f$, which can be broken down into two components as follows:

$$I_f=I_s \sin(\omega t)+I_c \cos(\omega t) \qquad (2)$$

Then, assuming that the rate of the variation of amplitudes of the sine and cosine components, $I_s$ and $I_c$, are small compared with $\omega$, the induced voltage V will be given by $$V=d/dt(LI_f)=\omega L_0(I_s\cos\omega t-I_c\sin\omega t)$$
$$+3\Gamma\omega L_0(I_s\sin 3\omega t+I_c\cos 3\omega t)$$
$$+\Gamma\omega L_0(-I_s\sin\omega t+I_c\cos\omega t) \quad (3)$$

The first term shows the voltage due to a constant inductance $L_0$, and the second term or the third harmonic term may be neglected in our approximation, since it is off resonance. The third term, which is essential for the generation of the second subharmonic, shows that the variable part of the inductance behaves like a negative resistance $-r=-\Gamma\omega L_0$ for the sine component $I_s$, but behaves like a positive resistance $+r=\Gamma\omega L_0$ for the cosine component $I_c$.

Figure 8:
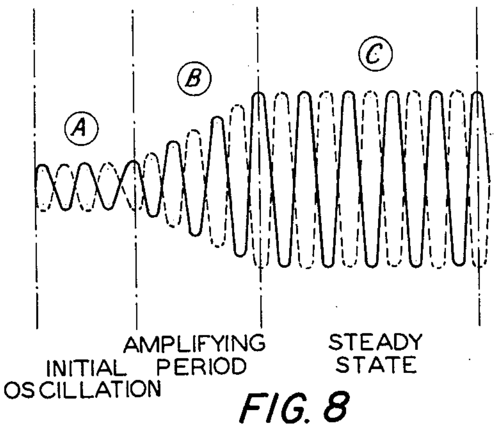
FIG. 8 is a diagram on an enlarged scale illustrative of the oscillations of parametrons.

Therefore, provided that the circuit, FIG. 6, is nearly tuned to $f$, the sine component $I_s$ of any small oscillation (Ⓐ in FIG. 8), will build up exponentially (Ⓑ in FIG. 8), while its cosine component will damp out rapidly. If the circuit were exactly linear, the amplitude would continue to grow indefinitely. Actually, the nonlinear B—H curve of the cores causes detuning of the resonance circuit and hysteresis loss also increases with increasing amplitude, so that a stationary state (Ⓒ in FIG. 8) will rapidly be established, as in vacuum-tube oscillators. The parametron has an amplitude limiting mechanism, which is essentially a nonlinear problem. The solution of the problem will be illustrated most readily by showing the locus of the sine and cosine components, $I_s$ and $I_c$ in the ($I_s$, $I_c$) plane. FIG. 7 shows an example of such loci for a typical case $\alpha=0, \delta=\Gamma/2$. The abscissa represents the sine component $I_s$ and the ordinate, the cosine component $I_c$ and $\alpha$ is the detuning. If we introduce polar coordinates (R, $\phi$) in the ($I_s$, $I_c$) plane, it will be easily seen from (1) that R and $\phi$, respectively, indicate the instantaneous amplitude and phase of the oscillation. The saddle point at the origin indicates the exponential build up of oscillation which is in a definite phase relation to the excitation wave of frequency $2f$. Spiral points A and A′ in the figure indicate the stable states of stationary oscillation. The existence of two possible phases in this oscillation which differ by $\pi$ radians from each other, corresponding to A and A′, should be noted. These two modes of oscillation are respectively shown by the solid line and dotted line in FIGS. 5 and 8. An especially important feature is that the choice between these two modes of stationary oscillation is effected entirely by the sign of the sine component of the small initial oscillations that have existed in the circuit (Ⓐ in FIG. 8). In other words, the choice between A and A′ in FIG. 7 depends on which side of the thick curve B—B′ (called separatrix) the point representing the initial state lies. An initial oscillation of quite small amplitude is sufficient to control the mode or the phase of stationary oscillation of large amplitude which is to be used as the output signal. Hence, the parametron has an amplifying action which may be understood as superregeneration. The upper limit of this superregenerative amplification is believed to be determined only by the inherent noise, and an amplification of as high as 100 db has been reported.

The existence of dual mode of stationary oscillation can be made use of to represent a binary digit, "0" and "1" in a digital system, and thus a parametron can store 1 bit of information. However, oscillation of parametrons in this stationary state is extremely stable, and if one should try to change the state of an oscillating parametron from one mode to another just by directly applying a control voltage to the resonant circuit, a signal source as powerful as the parametron itself would be necessary. This difficulty can be gotten around by providing a means for quenching the oscillation, and making the choice between the two modes, i.e., the rewriting of information, by a weak control voltage applied at the beginning of each building up period, making use of the superregenerative action.

Figure 10:
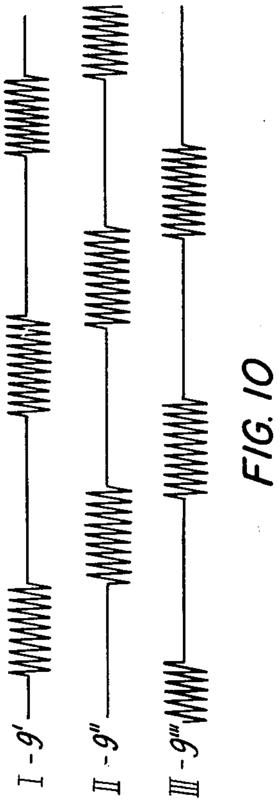
FIG. 10 is a diagram of the three beat excitation wave for exciting or synchronizing parametrons in group configurations.

Actually, this is done by modulating the exciting wave by a periodic wave which also serves as a clock pulse. Hence, for each parametron there is an alternation of active and passive periods, corresponding to the switching on and off of the exciting current. Usually, the parametron device uses three clock waves, labeled I, II and III, all having the same pulse recurrence frequency, but switched on and off after another in a cyclic manner with a partial time overlap as shown in FIG. 10. This method of exciting each of the parametrons in a digital system with either one of the three exciting waves I, II and III is usually called the "three beat" or the "three subclock" excitation and is later herein more fully described as applied to a delay line.

Figure 9:
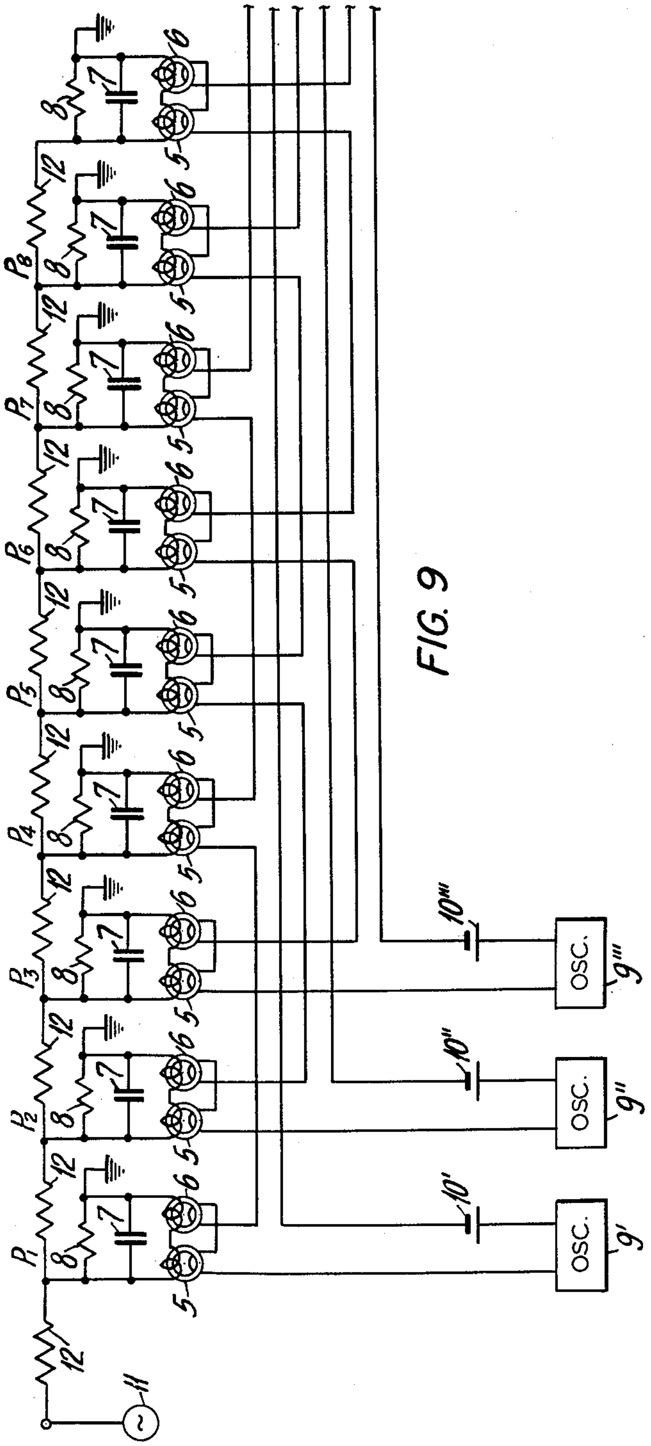
FIG. 9 is a diagram illustrative of how a delay line can be constructed using parametrons.

Digital systems can be constructed using parametrons by intercoupling parametron elements in different groups by a coupling element. The parametron is a synchronous device and operates in rhythm with the clock pulse. Each parametron can take in a new binary digit ("1" or "0") at the beginning of every active period, and transmit it to the parametrons of the next stage with a delay of one-third of the clock period. This delay can be used to form a delay line. FIG. 9 shows one such delay line which consists of parametrons simply coupled in a chain, each successive parametron element belonging each to the groups I, II, III, I . . . . Hence, the phase of oscillation of a parametron in the succeeding stage will be controlled by that in the preceding stage, and a binary signal $x$ applied to the leftmost parametron will be transmitted along the chain rightwards in synchronism with the switching of the exciting currents. Hence, the circuit may be used as a delay line or a dynamic memory circuit.

The delay line consists of a plurality of parametrons $P_1$–$P_8$ each of which has a pair of cores 5, 6 and a resonant circuit comprising a capacitor 7 and a resistance 8 in parallel. It will be understood that for ease of understanding and to simplify the drawings the various parametrons will be shown as having the various components parts thereof designated by the same or corresponding reference numerals. The resonant circuits of the individual parametrons are series resistance coupled by a plurality of resistances each designated as a coupling resistance 12. A series oscillator 11 is resistance coupled through a coupling resistance as shown, to the resonant circuits of all of the parametrons $P_1$–$P_8$.

Time-sequencing or synchronizing signals which are exciting "three beat" waves are applied to the individual parametrons by a plurality of oscillators 9′, 9″ and 9‴ and respective D.C. current sources 10′, 10″ and 10‴ connected in series to the exciting or primary windings of the parametrons. These oscillators operate at a frequency $2f$ and their oscillation is intermittent, as shown in FIG. 10, so that the exciting waves emitted have a partial time overlap. As illustrated the oscillator 9′ is connected in series with the primary coils of the parametrons $P_1$, $P_4$, $P_7$ the oscillator 9″ is in series with the primary coils of the parametrons $P_2$, $P_5$ and $P_8$; and the oscillator 9‴ is in series with the primary coils of the parametrons $P_3$, $P_6$, $P_9$ respectively. It can therefore be seen that the parametrons can be thought of as being connected in three groups the clock or synchronizing waves (FIG. 10) are labeled I, II and III correspond to the individual oscillators generating them and correspond to a respective group of parametrons.

For purpose of the example it is assumed that the alternating and direct currents are both limited to approximately one ampere. In a series connection of the parametrons as that disclosed in FIG. 9 if a very weak oscillation having a frequency 1 mc./s. with a phase representative of the binary digit "0" is applied by the oscillator 11 to the resonant circuit of the parametron $P_1$ and if the oscillators 9′, 9″ and 9‴ and the D.C. sources connected as shown an oscillation having a frequency 1 mc./s.

is generated in the resonant circuit of the parametron $P_1$ when it is excited by the oscillator 9′ and the phase of the oscillation in this parametron is determined by that of the phase of the input oscillator 11 or rather the phase of its output signal and the amplitude of the oscillations increases as described heretofore and then assumes a stabilized state.

The oscillation or oscillating voltage in parametron $P_1$ is transmitted or transferred to the resonant circuit of the parametron $P_2$ through the respective coupling resistor 12. This output of parametron $P_1$, therefore, is the control input to the parametron $P_2$ so that when the exciting wave is applied to parametron $P_2$ by its respective exciting oscillator 9″ a subharmonic oscillation is developed in the resonant circuit with the phase corresponding to the input from the parametron $P_1$. The oscillating voltage from parametron $P_2$ is transferred to parametron $P_3$ through its respective coupling resistor 12 so that when the exciting wave or current of oscillator 9‴ is impressed on parametron $P_3$ the phase of the oscillation of the resonant circuit corresponds to that of the input from the input oscillation from $P_2$. It follows that the phase condition of the input oscillator 11, which for purposes of example has been designated as corresponding to the binary digit "0," is communicated or transmitted from $P_1$ to $P_2$, $P_3$, $P_4$, $P_5$, etc. successively with a time delay. Thus, it is readily apparent that logical operations can be performed by the use of parametrons.

It should be remembered that the effective phase control signal acting on a given parametron can correspond to the algebraic sum of the outputs of three or more parametrons and that parametrons can operate by majority principle so that the input to a single parametron for controlling the phase of the oscillation thereof can be determined according to the majority of three binary-coded signals, $x$, $y$ and $z$ respectively represented by the oscillation modes of three input parametrons. It is only necessary that an odd number of inputs be employed and at present an allowable number of inputs is three or five in most cases. Thus the majority operation of parametrons outlined heretofore includes the basic logical operations "and" and "or."

Referring now to the present invention, FIG. 11 is a block diagram of an apparatus according to the invention in which a parallel register 21 is connected in series with a converter 22 which is in series with an output circuit 23. A control current generator 24 provides control current, as hereinafter described at length, to the converter 22. The register 21 is constructed to receive a plurality of parallel inputs along parallel paths and which are transmitted to the converter 22 which converts the outputs of the register 21 to time sequential outputs and these outputs are then taken out as the output of the circuit 23. The control generator 24 controls the converter 22 in such a manner that four bits representative of binary-coded data or information being transmitted in a parallel mode can be converted to a serial mode of transmission or five binary digits applied in parallel paths to the register 21 can be converted to series binary digit code and moreover, an eight parallel binary digit code can be converted to a series binary digit code. The input codes handled and converted are, for example, a 1 out of 4 code, a 2 out of 5 code and a 1 out of 8 code.

As an example of an application of the present invention for converting a parallel four binary digit code to a single binary digit is shown in FIG. 12*a* and shown by symbolic elements in FIG. 12*d*. Since the complete apparatus consists of several parametrons networks of parametrons are conveniently described by schematic or symbolic diagrams, a short summary of which follows in order to understand the symbolic diagrams. Each parametron is represented by a small circle shown in FIG. 12*d*. The circles are connected by a line if corresponding parametrons are coupled, one line is used per unit coupling intensity. When applicable a double line between circuits, not shown, indicates that both parametrons are coupled at double intensity. A short bar, not shown, across any coupling line denotes complementation, that is, both parametrons are coupled with reverse polarity. Otherwise, it is understood that they are coupled in the same polarity. If not specified parametrons are supposed to be excited with the three beat excitation described heretofore. It follows therefore that only parametrons belonging to different groups (I, II and III) as heretofore described, can be coupled, and the information is transmitted along these lines always in the direction: I→II, II→III and III→I.

It can be seen that each coupling line has a direction of transmission and to show this direction usually the output lines from a parametron will come from the right side of the circle and go to the left side of another circle as an input to it. As will be explained hereafter a special parametron called a constant parametron can be allowed to hold a certain condition corresponding to a respective binary digit of notation and serving as a phase reference. It is standard practice in symbolic diagrams that lines are omitted from the diagram on the constant parametrons in order to avoid complication. Moreover, in the drawings in order to specifically designate the oscillation phase of particular parametrons corresponding to the digits "0" and "1" their phase conditions will be inscribed in the circles in order to designate the phase condition or binary digit value corresponding thereto.

According to FIG. 12*a* an apparatus for converting a parallel four binary digit code (a 1 out of 4 code) into a serial code as shown comprises four parametrons $P_0$, $P_1$, $P_2$ and $P_3$. These parametrons have their resonant circuit comprising a capacitor 7 and a resistance 8 in parallel therewith. Their resonant circuits are in series with the converter which comprises two parallel parametrons $P_4$, $P_5$ which in turn have their outputs or resonant circuits resistance series coupled to the resonant circuit of a single output parametron $P_6$.

The register parametrons $P_1$, $P_2$ have their resonant circuits resistance coupled to the resonant circuits of the converter parametrons $P_5$ and $P_4$ respectively. The parametron $P_3$ has its resonant circuit resistance coupled to the resonant circuits of these two converter parametrons. A third input to the converter parametrons is provided through coupling resistances 12 from control means 24 later described in detail. Oscillators 9′, 9″, 9‴ are connected in series with the exciting windings of the register parametrons, the converter parametrons and the output parametron respectively.

Now assume that the decimal numbers 0, 1, and 3, when terminals 31, 32, 33 and 34 represent each of the four inputs for 1 out of 4 codes, correspond respectively to the cases in which the binary digit or value "1" appears at the terminal 31 and the value "0" at the other terminals, value "1" at 32 and value "0" at the other terminals, and the value "1" at the terminal 34 and value "0" at the other terminals, simultaneously. The output of the parametron $P_0$ is not picked up in the parallel type register, and the outputs of the parametrons $P_1$, $P_2$, and $P_3$ are supplied to the parametrons $P_5$, $P_4$, and $P_4$, $P_5$ respectively. Outputs of the parametrons $P_4$ and $P_5$ in the converter are supplied to the parametron $P_6$.

As indicated heretofore the output of parametron $P_0$ can be assumed as not being transmitted and the outputs of the parametron $P_1$, $P_2$ and $P_3$ are applied to the parametrons $P_5$, $P_4$, and $P_4$, $P_5$ respectively. The outputs of the parametrons $P_4$ and $P_5$ in the converter are applied to the parametron $P_6$.

Excitation current of $2f$ is applied to the parametrons in the register by the oscillator 9′ and D.C. source 10 connected in series with the primary windings of the individual parametrons. In a similar manner excitation or synchronizing current in three beats is applied to the parametrons of the converter and output circuit respectively by oscillators 9″ and 9‴ and D.C. sources 10″, 10‴. In order to convert the signals transmitted as outputs from the parametrons in the register a third control signal of frequency $f$ is applied to each of the resonant circuits of the parametrons $P_4$, $P_5$ of the converter. It will be remembered that a parametron will operate on a majority principle when an uneven number of inputs are applied thereto.

The third control inputs are applied from the control current generator 24 in which two control signals 41, 42 of frequency $f$ generated by correspondingly labeled parametrons $P_{41}$, $P_{42}$, as shown in FIG. 12*c* and later herein more fully described. These signals are shown in FIG. 12*b* and are opposite in polarity. One of these signals is applied to one of the parametrons in the converter and the other signal is applied to the other parametron. The control input signals are opposite in polarity at all times and, therefore, the polarity thereof or phases can be considered and designated as representative of binary digits "0" and "1" as designated in FIG. 12*b*. Since the two signals are variable it can be seen that values "0" and "1" are applied alternately to the parametrons $P_4$ and $P_5$ of the converter.

It will be understood that in the operation of the apparatus the phase of control current 41 has a phase representative of condition or value "1" and the control current has the phase representative of condition or binary digit "0" at a first time interval corresponding to one interval when the register is first excited and at a second interval the phases shift so the current phases represent reversed values and at this second interval corresponds to an interval in which the register is excited for a second time, etc. These intervals are shown in FIG. 12*b*.

The control current generator generating apparatus is shown in FIG. 12*c* in which parametrons $P_{41}$ and $P_{42}$ are connected in parallel and excited from an oscillator 9 by an input signal having a frequency $2f$ which applies an exciting current through the switching apparatus 50 first to the parametron $P_{41}$, then an exciting current only to parametron $P_{42}$, therefore, functioning to switch and connecting exciting current successively to the parametrons. A weak current having a frequency $f$ is impressed on the resonant circuits of the two parametrons $P_{41}$, $P_{42}$ by an oscillator 11 through coupling resistances each designated 12 in order to simplify the drawings. The phase of the frequency $f$ therefore corresponds to the phase of the oscillation in the oscillator 11. The two outputs are picked up as outputs 41 and 42 through a pair of transformers T, T′ and resistances 13 connected so that the phase of one of the outputs corresponds to the phase of the oscillation in the corresponding resonant circuit of one of the two parametrons and the other is picked up with its phase inverted so that the two signals are out of phase by 180° as shown in FIG. 12*b*. The connections from the transformer T′ shown in FIG. 12*c* allow the signal inversion.

Thus, if it is assumed that the values applied to the input terminals of the register are representative of the decimal digit 3 in which the binary digit "0" is applied to each of the input terminals 31, 32, and 33 and the binary digit or value "1" is applied to the terminal 34 and if the exciting current with frequency $f$ is applied by the source or oscillator 9′ the phase of the oscillation in the resonant circuit of each of the parametrons $P_0$, $P_2$ is representative of the value "0." The parametron $P_3$ is in condition "1" so that the output delivered from parametron $P_1$ to $P_5$ is representative of binary digit "0" and the output from parametron $P_2$ to parametron $P_4$ is binary digit "0." The output from parametron $P_3$ to both parametrons $P_4$ and $P_5$ is binary digit "1." However, when the parametrons $P_0$–$P_3$ in the register are excited by the synchronizing current as indicated heretofore the control current generating apparatus 24 is also excited and then currents 41 and 42 representative of values "1" and "0" respectively are applied to the parametrons $P_5$ and $P_4$ respectively. When parametrons $P_4$ and $P_5$ are excited by the synchronizing current from oscillator 9′ in this condition the oscillation in $P_5$ in the resonant circuit assumes a phase representative of binary condition "1" and the oscillation in the resonant circuit of the parametron $P_4$ assumes a phase condition representative of a condition "0."

In the output parametron $P_6$ one of the control inputs is a constant value "1" as shown and the other control input applied from the two converter parametrons as shown so that the parametron $P_6$ assumes a phase oscillation representative of binary condition "1" when excited by the oscillator 9‴ and this output can be taken from its output terminal. When the parametrons $P_0$–$P_3$ are again excited the value "1" is transmitted from parametron $P_3$ to the converter in the way as indicated heretofore but since the polarity of the control inputs 41 and 42 are reversed the binary conditions they represent are reversed so that their input is "0" and "1" respectively. It can be seen that when parametrons $P_4$ and $P_5$ are excited by the oscillator 9′ for the second time the parametron $P_5$ assumes an output oscillation representative of a binary condition "0" so that when $P_6$ is excited by its oscillator 9″ for a second time it also has an output representative of condition "1" which can be picked up as the output. In other words binary digit "1" can be taken out as an output of output parametron $P_6$ during the first and second excitations of the output parametron $P_6$ so that the decimal number 3 which is applied as an input to the parallel type register is converted to notation (1 1) representing the decimal number 3 in the binary system of notation and in a series mode.

When the parametron $P_2$ alone has an input signal representative of the value "1" applied thereto and each of the other parametrons have inputs representative of the value "0" in the register the value "0" is taken from the parametron $P_6$ at the first excitation thereof and the value "1" at the second excitation thereof thus representing the binary number (0 1). When the value "1" is applied only to the input terminal of the parametron $P_1$ the value "1" is taken from the output $P_6$ at the first excitation thereof and the value "0" at the second excitation thereof so that the binary number (1 0) is taken out as an output during the operation of the apparatus so that a parallel input is converted to a serial output.

FIG. 13*a* illustrates a circuit for converting 1-out-of-8 code of binary notation into a serial binary code. The circuit is shown in symbols as heretofore described. The register of this embodiment comprises eight parametrons $P_0$–$P_7$ in parallel having input terminals 51–58 respectively connected in series thereto. The parametrons of the register are connected in series with parametrons $P_8$–$P_{15}$ which form a first stage of the converter. The converter consists of three stages. A second stage is formed by two pairs of parametrons $P_{16}$–$P_{19}$ in which each parametron of a respective pair is connected to a respective two or pair of the eight parametrons in the first stage. A third stage of the converter comprises two parametrons $P_{20}$–$P_{21}$ in which the parametrons of each pair of the second stage are connected as a respective pair to a respective parametron in the third stage in the manner shown. The outputs of the parametrons in the third stage of the converter are connected in series with the output of parametron $P_{22}$.

Every other parametron in the first stage of the converter has a constant value "0" applied thereto and the constant value as shown is inscribed internally of the circle representative of the parametron to which it is applied as for example parametrons $P_8$, $P_{10}$, etc. One of the parametrons in each of the pairs of parametrons in the third stage have a constant value "1" applied thereto, as for example, parametrons $P_{17}$ and $P_{19}$. A parametron in the third stage comprising parametron 21 has a constant value "1" applied thereto as has the output parametron $P_{22}$. The phase representative of the output of these parametrons is, of course, designated by the inscribed binary digit or condition "0" and "1."

Each stage of the converter is controlled by a respective control current 41, 42 and 43 applied to respective similarly designated terminals. It being understood that the control current applied to terminal 43 is comparable to the currents or signals 41, 42 heretofore described and the generator as shown in FIG. 12*c* is provided with a parametron, not shown, to provide such a control signal 43. The stages of the converter are excited by time-sequencing or synchronizing waves having a partial time overlap shown in FIG. 13*b* are generated by oscillators, not shown in symbolic diagrams, in the manner heretofore described.

When the parallel type register is excited by the exciting current A1 from the oscillator 9′ the control current applied to terminal 41 is generated by a circuit, not shown, and the control current has a value "0." When the first stage of the converter is excited by the current B1 the control current applied at terminal 42 is also generated the same way as before and it has a phase representative of the binary digit "1." The second stage of the converter is excited by the exciting current C1 and the control current applied at terminal 43 is generated in the circuit in the same way as before as the other two control currents and has a value "1." As the third stage of the converter is excited by the exciting current A2 no control current is generated by A2 in this case. Similarly, the current B2 excites the series type output circuit only and the exciting current C2 has no influence on a parametron.

The parallel type register is again excited by a second exciting current A3 simultaneously with the generation of the control current applied at terminal 41 having a value "1." When the first stage of the converter is excited by exciting current B3 the value of the generator control current applied at terminal 42 has a value "0" assigned thereto and when the second stage is excited by exciting current C3 the control current applied at terminal 43 corresponds to binary condition "1."

The third stage of the converter is excited by current A4 and B4 excites the series output circuit parametron $P_{22}$. The exciting current C4 has no influence on any of the parametrons. The exciting current A5 excites the parallel register and the control current applied at terminal 41 is generated simultaneously and has a phase representative of a value "1" so that when the first stage of the converter is excited by exciting current B5 the control current applied at 42 has a value "1" and when the second stage is excited by current or wave C5 the control current applied at terminal 43 is generated simultaneously and has a value of "0." The control current A6 excites the third stage of the converter and B6 excites the output circuit while the exciting current C6 has no influence on any of the parametrons.

In the parametrons in the first stage of the converter, the constant value "0" is applied to parametrons $P_8$, $P_{10}$, $P_{12}$ and $P_{14}$, and the control current applied at terminal 41 is to be received by the parametrons provided with the constant value in the first stage of the converter. In the second stage the constant value "1" is applied to parametrons $P_{17}$ and $P_{19}$, and the control current 42 is applied to parametrons $P_{16}$ and $P_{18}$. In the third stage, the constant value "1" is applied to parametron $P_{21}$, and the control current from terminal 43 to parametron $P_{20}$. In such a circuit the value "1" is applied only to the terminal 55 and the value "0" to each of the other input terminals.

When the parallel type register is excited by the exciting current A1 and the parametron $P_4$ is in condition "1" and the others assume the condition "0" the value "1" is transmitted to the parametron $P_{12}$ but each of the other parametrons in the first stage of the converter are impressed with the value "0." Furthermore, when the parallel type register is subjected to the first excitation, the parametron $P_{12}$ assumes a state or condition "0" since it is always provided with the constant value "0," even when it receives the value "0" from the parallel type register, since the value of the control current is "0." It is obvious that all other parametrons in the first stage have assumed the state or condition "0." Therefore, the value "0" is transferred to the parametrons $P_{16}$, $P_{17}$ $P_{18}$ and $P_{19}$ from the first stage.

When the parametrons in the first stage of the converter are excited by the exciting current B1, the value of the control current is "1" which is applied to $P_{16}$ and $P_{18}$. However, since the constant value "1" is applied only to parametrons $P_{17}$ and $P_{19}$, every parametron in the second stage, is in the state "0" when excited by the exciting current C1, and the value "0" is transmitted to the parametron in the third stage.

When the parametrons in the second stage are excited, the value of the control current 43 is "1" and is transferred to each parametron in the third stage. Consequently, even when the constant value "1" is applied to the parametron $P_{21}$ and the third stage is excited by the exciting current A2, the parametrons $P_{20}$ and $P_{21}$ both assume the state "0" and each transmits the value "0" to the parametron $P_{22}$ as the output. The parametron $P_{22}$ is excited by the exciting current B2, and so it remembers the value "0" and sends it out as the output.

When the parallel type register is excited by the exciting current A3, the value "1" is again transmitted from the parametron $P_4$ to the parametron $P_{12}$ and all the other parametrons in the register transfer the value "0" to the converter parametrons connected to them. As the value of control current applied at 41 is "1" in this case, the parametron $P_{12}$ remembers "1" and transmits it to parametron $P_{18}$ in the second stage, when the first stage is excited by the exciting current B3, and the other parametrons remember "0"s and transmit them to the parametrons $P_{16}$, $P_{17}$ and $P_{19}$. And since the control current 42 has the value "0" in this case, every parametron in the second stage, when excited by the exciting current C3, remembers "0" and applies it to the parametrons $P_{20}$ and $P_{21}$ in the third stage. The value of the control current 43 is "1" in this case, but, when the third stage is excited by the exciting current A4, both parametrons $P_{20}$ and $P_{21}$ remember the value "0" which is transmitted to $P_{22}$. When the parametron $P_{22}$ is excited by the exciting current B4, it remembers the value or digit "0" and sends it out as the output.

When the parallel type register is subjected to the third influence by the exciting current A5, the parametron $P_4$ alone remembers "1" and singly impresses it on parametron $P_{12}$ and the other parametrons remember the value "1" and each of them transfers it to the corresponding parametron in the first stage. Since the control current 41 has the value "1" in this case, the parametrons $P_{12}$ remembers "1" and transmits it to the parametron $P_{18}$. When the first stage of the converter is excited by the exciting current B5, each of the other parametrons remembers "0" and transmits it to the corresponding parametron in the second stage. As the value of current 42 is "1" in this case, the parametron $P_{18}$ remembers "1" and transfers it to the parametron $P_{21}$ in the third stage and parametrons $P_{16}$, $P_{17}$, $P_{19}$ remember "0" and transmit it to parametrons $P_{20}$ and $P_{21}$. Although the value of the control current 43 is "0" in this case, parametron $P_{21}$ remembers "1" and transfers its output to $P_{22}$, when the third stage is excited by the exciting current A6, because the parametron $P_{21}$ is always impressed with the constant value "1." But the parametron $P_{20}$ remembers the value "0" and transmits it to the parametron $P_{22}$. When the parametron $P_{22}$ is excited by the exciting current B6, it remembers "1" and can pick it up as the output since the output parametrons $P_{22}$ is impressed with the constant value "1."

In other words, it is possible to pick up the outputs in the order of "0," "0," "1" by suppling the parallel type values to the parallel type register when the series type register is excited by the exciting currents B2, B4, and B6, and the result is represented by the values "1," "0," "0" on the binary code.

Examples of the conversion of the values of other parallel type codes will be clarified by the following table.

| | | | |
|---|---|---|---|
| 41 | 0 | 1 | 1 |
| 42 | 1 | 0 | 1 |
| 43 | 1 | 1 | 0 |
| output $P_{22}$: | | | |
| 51=1 | 0 | 0 | 0 |
| 52=1 | 1 | 0 | 0 |
| 53=1 | 0 | 1 | 0 |
| 54=1 | 1 | 1 | 0 |
| 55=1 | 0 | 0 | 1 |
| 56=1 | 1 | 0 | 1 |
| 57=1 | 0 | 1 | 1 |
| 58=1 | 1 | 1 | 1 |

Namely, when "1" is applied to input terminal 58 and all other input terminals are impressed with "0" (decimal number 7) for example, 1 1 1 can be picked up from the series type register.

Furthermore, when the third stage of the converter is excited by the exciting current A2 in the above-mentioned circuit, the parallel type register is devised not to be influenced by current A2, but it is permitted that the parallel type register is influenced by A2 and the value of current 41 is converted. It is readily apparent that parallel type codes can be converted into series type codes by the apparatus relating to the present invention.

While preferred embodiments of the invention have been shown and described it will be understood that many modifications and changes can be made within the true spirit and scope of the invention.

What we claim and desire to secure by Letters Patent is:

1. Apparatus for converting binary-coded data and information from a parallel mode of transmission to a serial mode of transmission comprising, a first and at least a second plurality of parallel resonant circuits in cascade and an output resonant circuit in cascade with said second plurality of parametrons, means for applying respective inputs to respective ones of said first plurality of parallel resonant circuits simultaneously along respective parallel paths at least some of which are combinations of binary digits representative of binary-coded data and information, each resonant circuit having a resonant frequency of near $f$ and each including an input, an output and a variable reactance the value of which is a parameter determining the resonant frequency of said resonant circuit, said first and second pluralities of resonant circuits being coupled to each other with the output of at least some of the preceding resonant circuits being coupled to the input of succeeding resonant circuits, means for varying said parameters comprising at least three alternating power supply circuits each having a frequency $2f$, means applying said $2f$ frequency from one of said power supply circuits to said variable reactances in said first plurality of resonant circuits and applying said frequency $2f$ from a second one of said power supply circuits to the variable reactances in the remaining parallel resonant circuits and from a third power supply circuit to said output resonant circuit to vary the values of said reactances and thereby generate in said resonant circuits parametric oscillations having a frequency $f$ and one of two phases differing by 180 degrees from each other, means coupling said power supply circuits to said resonant circuits in balanced bucking relationship so that said frequency $2f$ of the power supply circuits is not transmitted to said resonant circuits and the frequency $f$ of said resonant circuits is not transmitted back to said power supply circuits, and means for controlling each of said power supply circuits for interrupting the oscillations of frequency $f$ in preceding circuits at a time just after the parametric oscillations are generated in the succeeding resonant circuits, whereby binary digits are represented by respective phases of the parametric oscillations and the phase of preselected combinations of the frequency $f$ generated in preceding resonant circuits control the phase of the frequency $f$ generated in subsequent resonant circuits and the oscillations generated in the subsequent resonant circuits is maintained even after the oscillations in the preceding resonant circuits are interrupted, and means including means connected to said second plurality of parallel resonant circuits to apply phase control inputs to control the phase of the oscillations in said parallel parametrons to cause them to apply a preselected phase control input to said output resonant circuit in dependence upon the combination of binary-coded information data inputs to said first plurality of resonant circuits, whereby the phase of the output oscillation of said output is representative of a preselected binary digit and successive different combinations of binary-coded parallel inputs applied to said first plurality of resonant circuits are converted to serial binary digits representative of said binary-coded data and information.

2. Apparatus for converting binary-coded data and information from a parallel mode of transmission to a serial mode of transmission comprising, a first and second plurality of parallel resonant circuits in cascade and an output resonant circuit in cascade with said second plurality of parametrons, means for applying respective inputs to respective ones of said first plurality of parallel resonant circuits simultaneously along respective parallel paths at least some of which are combinations of binary digits representative of binary-coded data and information, each resonant circuit having a resonant frequency of near $f$ and each including an input, an output and a variable reactance the value of which is a parameter determining the resonant frequency of said resonant circuit, said first and second pluralities of resonant circuits being coupled to each other with the output of at least some of the preceding resonant circuits being coupled to the input of succeeding resonant circuits, means for varying said parameters comprising at least three alternating power supply circuits each having a frequency $2f$ and a source of D.C. bias, and means applying said $2f$ frequency from one of said power supply circuits to said variable reactances in said first plurality of resonant circuits and applying said frequency $2f$ from a second one of said power supply circuits to the variable reactances in the remaining parallel resonant circuits and from a third power supply circuit to said output resonant circuit to vary the values of said reactances and thereby generate in said resonant circuits parametric oscillations having a frequency $f$ and one of two phases differing by 180 degrees from each other, means coupling said power supply circuits to said resonant circuits in balanced bucking relationship so that said frequency $2f$ of the power supply circuits is not transmitted to said resonant circuits and the frequency $f$ of said resonant circuits is not transmitted back to said power supply circuits, and means for controlling each of said power supply circuits for interrupting the oscillations of frequency $f$ in preceding circuits at a time just after the parametric oscillations are generated in the succeeding resonant circuits, whereby binary digits are represented by the phase of the parametric oscillations and the phase of preselected combinations of the frequency $f$ generated in preceding resonant circuits control the phase of the frequency $f$ generated in subsequent resonant circuits and the oscillation generated in the subsequent resonant circuits is maintained even after the oscillations in the preceding resonant circuits are interrupted, and means including means connected to said second plurality of parallel resonant circuits to apply phase control inputs to control the phase of the oscillations in said parallel parametrons to cause them to apply a preselected phase control input to said output resonant circuit in dependence upon the combination of binary-coded information data inputs to said first plurality of resonant circuits, whereby the phase of the output oscillation of said output is representative of a preselected binary digit and successive different combinations of binary-coded parallel inputs applied to said first plurality of resonant circuits are converted to serial binary digits representative of said binary-coded data and information.

3. Apparatus for converting binary-coded data and information from a parallel mode of transmission to a serial mode of transmission comprising, a first and second plurality of parallel resonant circuits in cascade and an output resonant circuit in cascade with said second plurality of parametrons, means for applying respective inputs to respective ones of said first plurality of parallel resonant circuits simultaneously along respective parallel paths at least some of which are combinations of binary digits representative of binary-coded data and information, said first plurality of resonant circuits being equal in number to the parallel paths by which the respective resonant circuits have said binary-coded information and data applied thereto, each resonant circuit having a resonant frequency of near $f$ and each including an input, an output and a variable reactance the value of which is a parameter determining the resonant frequency of said resonant circuit, said first and second pluralities of resonant circuits being coupled to each other with the output of at least some of the preceding resonant circuits being coupled to the input of succeeding resonant circuits, means for varying said parameters comprising at least three alternating power supply circuits each having a frequency $2f$, means applying said $2f$ frequency from one of said power supply circuits to said variable reactances in said first plurality of resonant circuits and applying said frequency $2f$ from a second one of said power supply circuits to the variable reactances in the remaining parallel resonant circuits and from a third power supply circuit to said output resonant circuit to vary the values of said reactances and thereby generate in said resonant circuits parametric oscillations having a frequency $f$ and one of two phases differing by 180 degrees from each other, means coupling said power supply circuits to said resonant circuits in balanced bucking relationship so that said frequency $2f$ of the power supply circuits is not transmitted to said resonant circuits and the frequency $f$ of said resonant circuits is not transmitted back to said power supply circuits, and means for controlling each of said power supply circuits for interrupting the oscillations of frequency $f$ in preceding circuits at a time just after the parametric oscillations are generated in the succeeding resonant circuits, whereby binary digits are represented by respective phases of the parametric oscillations and the phase of preselected combinations of the frequency $f$ generated in preceding resonant circuits control the phase of the frequency $f$ generated in subsequent resonant circuits and the oscillation generated in the subsequent resonant circuits is maintained even after the oscillations in the preceding resonant circuits are interrupted, and means including means connected to said second plurality of parallel resonant circuits to apply phase control inputs to control the phase of the oscillations in said parallel parametrons to cause them to apply a preselected phase control input to said output resonant circuit in dependence upon the combination of binary-coded information data inputs to said first plurality of resonant circuits, whereby the phase of the output oscillation of said output is representative of a preselected binary digit and successive different combinations of binary-coded parallel inputs applied to said first plurality of resonant circuits are converted to serial binary digits representative of said binary-coded data and information.

4. Apparatus according to claim 3, in which the first plurality of resonant circuits comprise four resonant circuits in parallel, said second plurality comprising two resonant circuits, three only of the first plurality being connected in cascade with said second plurality, one of said three resonant circuits only being connected to one of said two resonant circuits, and the means for applying phase control inputs to said second plurality of resonant circuits comprising, means for applying said phase control inputs as respective periodic waveforms to said two resonant circuits simultaneously and each alternately varying between two phases respectively representative of the two binary conditions "0" and "1," the phases of the respective waveforms always being opposite when applied to said two resonant circuits, and means to apply a phase control input constantly to said output resonant circuit constantly representative of one of said two binary conditions and digits.

5. Apparatus for converting binary-coded data and information from a parallel mode of transmission to a serial mode of transmission comprising, a first and at least a second plurality of parallel resonant circuits in cascade and an output resonant circuit in cascade with said second plurality of parametrons, means for applying respective inputs to respective ones of said first plurality of parallel resonant circuits simultaneously along respective parallel paths at least some of which are combinations of binary digits representative of binary-coded data and information, said first plurality of resonant circuits being equal in number to the parallel paths by which the respective resonant circuits have said binary-coded information and data applied thereto, said second plurality of resonant circuit being arranged in three stages in cascade, the first of said stages comprising a number of resonant circuits equal in number to said first plurality, each resonant circuit having a resonant frequency of near $f$ and each including an input, an output and a variable reactance the value of which is a parameter determining the resonant frequency of said resonant circuit, said first and second pluralities of resonant circuits being coupled to each other with the output of at least some of the preceding resonant circuits being coupled to the input of succeeding resonant circuits, means for varying said parameters comprising at least three alternating power supply circuits each having a frequency $2f$, and means applying said $2f$ frequency from one of said power supply circuits to said variable reactances in said first plurality of resonant circuits and applying said frequency $2f$ from a second one of said power supply circuits to the variable reactances in the remaining parallel resonant circuits and from a third power supply circuit to said output resonant circuit to vary the values of said reactances and thereby generate in said resonant circuits parametric oscillations having a frequency $f$ and one of two phases differing by 180 degrees from each other, means coupling said power supply circuits to said resonant circuits in balanced bucking relationship so that said frequency $2f$ of the power supply circuits is not transmitted to said resonant circuits and the frequency $f$ of said resonant circuits is not transmitted back to said power supply circuits, and means for controlling each of said power supply circuits for interrupting the oscillations of frequency $f$ in preceding circuits at a time just after the parametric oscillations are generated in the succeeding resonant circuits, whereby binary digits are represented by respective phases of the parametric oscillations and the phase of preselected combinations of the frequency $f$ generated in preceding resonant circuits control the phase of the frequency $f$ generated in subsequent resonant circuits and the oscillation generated in the subsequent resonant circuits is maintained even after the oscillations in the preceding resonant circuits are interrupted, and means including means connected to said second plurality of parallel resonant circuits to apply phase control inputs to said three stages separately to control the phase of the oscillations in said parallel parametrons to cause them to apply a preselected phase control input to said output resonant circuit in dependence upon the combination of binary-coded information data inputs to said first plurality of resonant circuits, whereby the phase of the output oscillation of said output is representative of a preselected binary digit and successive different combinations of binary-coded parallel inputs applied to said first plurality of resonant circuits are converted to serial binary digits representative of said binary-coded data and information.

6. Apparatus according to claim 5, in which said binary-coded data is applied to said first plurality of resonant circuits in a code of eight binary digits, the second plurality of parallel resonant circuits are arranged in three stages, a first stage comprising a number of resonant circuits equal in number to said first plurality of resonant circuits, said first plurality comprising eight resonant circuits, a second stage comprising four resonant circuits and another stage comprising two resonant circuits in cascade with respective ones of the resonant circuits in the first stage, to convert said binary-coded data in a 1 out of 8 code, and the means for applying phase control inputs to said three stages, waveforms having alternately two different phases respectively representative of the two conditions "0" and "1" of binary notation.

No references cited.